Patented Jan. 19, 1954

2,666,752

UNITED STATES PATENT OFFICE 2,666,752

STABILIZER FOR HALOGEN-CONTAINING POLYMERS

Oliver J. Grummitt and Robert E. Blank, Cleveland, Ohio, and Herbert F. Schwarz, Flossmoor, Ill., assignors to The Sherwin-Williams Company, Cleveland, Ohio, a corporation of Ohio No Drawing. Application January 17, 1950, Serial No. 139,127

9 Claims. (Cl. 260—23)

This invention relates as indicated to synthetic resins, and is primarily concerned with compositions of the halogen-containing polymer type which are beneficially stabilized in that they are remarkably resistant to decomposition ordinarily induced by heat and light.

Polymeric compositions containing halogen atoms such as fluorine, chlorine, and bromine deteriorate on exposure to heat and/or light. Such exposure, especially to heat, frequently occurs during fabrication of the material, and light exposure may occur throughout the life of the material. These conditions result in discoloration, embrittlement, and loss of strength in cast or extruded films, coatings, etc. This invention concerns agents which will inhibit or effectively retard this deterioration in halogen-containing polymers in extruded sheets, molded objects, unsupported films, coated fabrics and coating compositions. A further object is to provide agents which do not alter substantially the transparency of clear polymers or the color of pigmented polymers. It is also an object of this invention to provide an agent which is compatible with halogen-containing polymers in composition with other ingredients such as plasticizers, alkyd resins, phthalates, phosphates, pigments, and the like. Other objects of this invention will appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of our invention may be employed.

Broadly stated, our invention is in the provision of a composition comprising a halogen-containing polymer and an aliphatic acid ester of a polyhydric alcohol in which ester from about 25% to below 75% of the available free hydroxyl groups have been acylated with an aliphatic acyl compound having the general formula:

R—X where R is an aliphatic acyl radical of 1 to 6 carbon atoms, and X is selected from —OH, —SH, —O—R, —S—R, and halogen. More particularly, our invention is in the provision of a composition having as a major constituent thereof a polyvinyl halide, which composition has been stabilized with from .1 to 10 parts per 100 parts of polymer of an agent consisting of the partial esters of polyhydric alcohols and the acids of animal and vegetable oils in which ester from 25% to below 75% of the available hydroxyl groups have been acylated by interaction with another fatty acid or fatty acid anhydride containing from 1 to 6 carbon atoms in the acyl group.

We have discovered that highly effective heat and light stabilizing agents consist of partial esters of polyhydric alcohols with fatty acids in which only a portion of the free hydroxyl groups have been esterified by a low molecular weight fatty acid or low molecular weight fatty acid anhydride. The higher molecular weight fatty acids from which the partial esters are formed may include any of those found in the naturally occurring animal and vegetable oils such as lauric, palmitic, stearic, oleic, linoleic, linolenic, ricinoleic, dihydroxystearic, etc. The polyhydric alcohol may be a glycol such as ethylene glycol, propylene glycol, or glycerol, trimethylolethane, pentaerythritol, mannitol, sorbitol, and the like. The low molecular weight fatty acids useful in accordance with this invention generally contain in the acyl group or each acyl group, as the case may be, from 1 to 6 carbon atoms. In general, any aliphatic compound capable upon reaction of yielding to the partial ester above described an acyl radical of from 1 to 6 carbon atoms may be used and such aliphatic compound may be in the form of a carboxylic acid, the anhydride, or the acid halide, e. g. chloride or bromide. We may also use the thio analogues of the acid and anhydride, e. g. the thiol carboxylic acids and the thiol anhydrides yielding acyl groups of from 1 to 6 carbon atoms. Specific examples of such materials include formic acid, acetic acid, acetic anhydride, acetyl chloride, propionic acid, thiol propionic acid, propionyl chloride, butyric acid, iso-butyric acid, thiol butyric acids, pentanoic acids, thiol pentanoic acids, hexanoic acids, etc. The presence of halogen atoms in the molecules of these aliphatic acyl providing compounds in an inactive position, such as the omega position on the 4, 5, and 6 carbon atom acyl radical providing compounds, as well as the presence of oxygen in the form of keto or ether groups in the aliphatic residue of the acid may be tolerated, although we prefer the alkyl acids and anhydrides having from 1 to 6 carbon atoms in each acyl group, and particularly acetic acid and acetic anhydride.

While we have indicated that halogen-containing polymers in general are beneficiated by the stabilizers of this invention, we have found that these stabilizers are particularly useful when used in combination with the vinyl halide polymers such as the vinyl chlorides, the vinyl fluorides, and the vinyl bromide polymers. We intend to include also copolymers of the aforementioned vinyl halides with vinyl alcohol or with a vinyl ester of an aliphatic acid, such as vinyl acetate. A class of vinyl copolymers with which the stabilizers of this invention may be used to advantage are the vinyl chloride-vinyl acetate copolymers containing therein about 60% to 95% by weight of vinyl chloride. This class of resins is disclosed in the patent to Reid, 1,935,577. Other useful vinyl resins are disclosed in the patent to Semon, 1,929,453. We may also use mixed resins, e. g. a mixture of polyvinyl chloride and a copolymer of polyvinyl chloride with polyvinyl acetate or polyacrylonitrile. Satisfactory results are obtained with the vinylidene halides. Thus where we refer to a vinyl halide resin herein, we intend any of the foregoing vinyl halide-containing resins, it being understood that the vinylidene halides are equivalent thereto for the purposes of this invention. Generally these vinyl halide resins will contain a major amount of vinyl halide such as vinyl chloride and by the term "major amount" we mean in excess of 50% vinyl halide up to and including 100% of a particular vinyl halide or a 100% mixture of vinyl halides.

The base ester, for example, a mono-ricinoleate of a polyhydric alcohol, such as glycerine, may be synthesized, or derived from the glyceride such as castor oil. It is clear that in any case, except where expensive fractionation procedures or special synthesis are employed, that the resultant product will be a mixture of mono-fatty acid esters and the higher esters. However, we intend by the term "mono ester of a polyhydric alcohol" to uncover a synthetic or derived ester wherein the quantities of reactants employed in either the synthesis or the derivation are such as to favor the formation of the mono ester. Thus where castor oil, for example, is treated with glycerine to form the "monoglyceride" the amount of glycerin employed will be preferably at least that which stoichiometrically favors monoglyceride formation, although it is recognized that the resultant product contains mono- di- and tri-glyceride, as well as minor amounts of glycerides of acids other than ricinoleic acid which are ordinarily present in castor oil. The glycerolysis of any animal or vegetable oil will result in a mixture of esters differing not only in degree of esterification but also in the kind of ester which will result. Such a mixture may then be acylated, or a separation of the monoglyceride effected by a suitable process, such as solvent extraction fractional crystallization from hot alcohol, and the monoglyceride then acylated. It has been found, however, to be unnecessary to isolate a particular monoglyceride prior to acylation. The fatty acid radical in these partial esters of polyhydric alcohols is broadly a hydroxy-aliphatic acyl group containing from 18 to 24 carbon atoms, and preferably at least one hydroxyl group. Unsaturation may also occur in such acyl radical.

The following examples are illustrative of the alcoholysis of castor oil with glycerine, the acylation step, and the blending with a vinyl halide resin. It is to be understood that these examples are for illustrative purposes only, i. e. to demonstrate a preferred method and employment by which the compositions of this invention may be produced and used. Such examples are not to be construed as limiting the invention to the precise examples or conditions shown.

EXAMPLE I

The synthesis of a typical stabilizer based on ricinoleic acid, glycerol, and acetic acid is described here. A mixture of 1868 grams of a refined grade of castor oil and 553 grams of glycerol is heated to 160° C., and 7.5 ml. of a calcium naphthenate solution (consisting of 5% calcium as the naphthenate dissolved in mineral spiirts) is added. The calcium naphthenate acts as a catalyst for the alcoholysis reaction between the oil and the glycerol. The mixture is gradually heated to 210-215° C. and held for 3 hours with efficient stirring. After cooling to room temperature and standing for ½ hour the excess glycerol (lower layer) is removed by centrifuging. The product weighed 2200 grams. Its hydroxyl content was 13.8%, Gardner color, 3-5, and specific gravity (25/25) about 1.00.

Since castor oil contains 80-85% of ricinoleic acid groups, minor components are the glycerides of other acids such as oleic, linoleic, and stearic.

The glyceride mixture, 2200 g., is heated to 160-165° C. and acetylated by the careful portionwise addition of 915 g. of acetic anhydride. After the addition the mixture is heated at gentle reflux for one-half hour, transferred to a Claisen distilling flask and stripped at 75-140° C. (pot temperature) and a reduced pressure of 30-40 mm. to remove most of the acetic acid. The final stripping is done at 140-150° C./4-6 mm. The hot residue is suction filtered to remove traces of calcium soaps. The yield of stabilizer was 2470 g., its hydroxyl content was 5.3-5.7%, its saponification number was 300-310, acid number about 1.0, Gardner color, 6-9, and specific gravity at 25/25 about 1.00.

In this particular illustration the amount of acetic anhydride was equivalent to approximately 50% of the available hydroxyl groups in the glyceride mixture. Thus the product was a mixed alcohol-ester based on both ricinoleic and acetic acid groups with free alcoholic groups remaining to the extent of 5-6% by weight. A part of these alcoholic groups are on the ricinoleic acid radicals and the remainder are attached to the glycerol radical.

EXAMPLE 2

100 parts by weight of a polymer of vinyl chloride was mixed thoroughly with 50 parts by weight of dioctyl phthalate and 3.0 parts by weight of various stabilizers. The stabilizers tested in separate batches were:

A. Strontium naphthenate
B. 35% acetylated monoglyceride of castor oil
C. 50% acetylated monoglyceride of castor oil
D. 65% acetylated monoglyceride of castor oil The mixture of polymer, plasticizer, and stabilizer was milled for two minutes at 149° C. on a two-roll mill. The milled sheet was molded for 30 seconds under 2000 pounds per square inch pressure in a hydraulic press heated to 149° C., to give a colorless, transparent, six inch square sheet approximately 0.090 inch thick. The samples from the sheets containing partially acetylated monoglyceride of castor oil showed less discoloration after heating in an air-circulating oven and exposure in an Eveready twin carbon arc ultra violet light tester than similar sheets containing no stabilizer or strontium naphthenate as a stabilizer (see Table I).

catalysts such as litharge, lime, sodium hydroxide, etc. may be used. Catalysts, reaction weight, and reaction temperature should be such that the alcoholysis reaction proceeds substantially to equilibrium. The temperature of the acylation need only be such that the reaction between the alcohol groups and the acylation reactant takes place at a convenient rate.

The ratio of reactants may be varied. In Example I above, the mol ratio of glycerol to castor oil is 3:1, respectively. Theoretically, the mono-

Table I

| | No stabilizer | Strontium naphthenate | 35% acetylated monoglyceride of castor oil | 50% acetylated monoglyceride of castor oil | 65% acetylated monoglyceride of castor oil | 50% acetylated monoglyceride of cottonseed oil |
|---|---|---|---|---|---|---|
| 1. Amount used (parts/100 parts of polymer). | 0 | 3.0 | 3.0 | 3.0 | 3.0 | 3.0. |
| 2. Color of original sheet. | None | Very slight | None | None | None | None. |
| 3. Transparency of original sheet. | Clear | Clear | Clear | Clear | Clear | Clear. |
| 4. Blooming or exuding of stabilizer to surface of sheet. | None | None | None | None | None | None. |
| 5. Water absorption (percent gain in weight after immersion for 7 days at 85° C.). | 1.2 | 3.4 | 1.4 | 1.3 | 1.3 | 1.2. |
| 6. Heat loss (percent loss in weight after 96 hrs. in an oven at 100° C.). | 2.6 | 3.6 | | 3.0 | | |
| 7. Heat stability (after 3 hrs. in oven at 150° C.). | Poor | Fair | Good | Good | Good | Good. |
| 8. Heat stability (after 30 min. in oven at 174° C.). | do | do | do | do | do | Do. |
| 9. Light stability (after 21 days in Eveready twin carbon arc ultra violet light tester). | do | do | do | do | do | Do. |

EXAMPLE 3

100 parts by weight of a polymer containing 93% vinyl chloride and 7% vinyl acetate was mixed thoroughly with 50 parts by weight of dioctyl phthalate and 3.0 parts by weight of 50% acetylated monoglyceride of castor oil. The mixture of polymer, plasticizer, and stabilizer was milled for two minutes at 149° C. on a two roll mill. The milled sheet was molded for 30 seconds under 2000 pounds per square inch pressure in a hydraulic press heated to 149° C. to give a colorless, transparent, six inch square sheet approximately 0.090 inch thick. Samples from the sheet containing 50% acetylated monoglyceride of castor oil showed much less discoloration after heating in an air circulating oven and exposure in an Eveready twin carbon arc ultra violet light tester than similar samples from a sheet containing no stabilizer (see Table II).

Table II

| | No stabilizer | 50% acetylated monoglyceride of castor oil |
|---|---|---|
| 1. Amount used (parts per 100 parts of polymer) | 0 | 3.0. |
| 2. Color of original sheet | None | None. |
| 3. Transparency of original sheet | Clear | Clear. |
| 4. Blooming or exuding of stabilizer to surface of sheet: | | |
| a. After 30 days standing at room temperature. | None | None. |
| b. After 21 days in light tester | do | Do. |
| 5. Water absorption (percent gain in weight after immersion for 7 days at 85° C.). | 7.0 | 6.9. |
| 6. Heat loss (percent loss in weight after 96 hrs. in an oven at 100° C.). | 3.3 | 3.2. |
| 7. Heat stability (after 3 hrs. in oven at 150° C.). | Poor | Good. |
| 8. Heat stability (after 30 min. in oven at 174° C.) | do | Do. |
| 9. Light stability (after 21 days in Eveready twin carbon arc ultra violet light tester). | do | Do. |

The catalyst and temperatures given in Example I are not critical. Instead of calcium naphthenate, any of the well known alcoholysis glyceride requires a ratio of 2:1, but the reversible nature of the reaction is responsibe for an equilibrium mixture of mono-di-and tri-glycerides along with unreacted glycerol. To favor monoglyceride formation, a ratio greater than 2:1 may be used. Suitable products are obtained, however, at ratios above or below 2:1.

As indicated above an alternative route to this mixture of partial esters is by direct esterification of the polyhydric alcohol, e. g. glycerol with fatty acids, e. g. ricinoleic acid. The mixture of mono-di-and tri-glycerides and glycerol, for example, can be made equally well in this way although it is usually more convenient and economical to employ the alcoholysis reaction.

Throughout the foregoing description we have referred to ricinoleates as derived from castor oil and by direct synthesis from the component materials. However, instead of castor oil other animal or vegetable oils or mixtures thereof, such as cottonseed oil, fish oil, soy bean oil, linseed oil, etc. may be used. These are not as desirable as the preferred natural oil since it has been found that stabilizing activity is improved when free hydroxyl groups are initially present in the fatty acid radical. Oils based on ricinoleic, dihydroxystearic and the like, or synthetics thereof constitute the preferred class for use in accordance with this invention.

Stabilizing tests on the unacylated partial esters of glycerol derived from castor oil, cottonseed oil, etc. show that such substances are active, but a serious limitation on the use of such materials is their low compatibility with polymers and copolymers containing substantial amounts of polyvinyl halide, and the tendency to migrate to the surface of films and sheets where they form a greasy film and result in unslightly appearance. To increase the compatibility and decrease migration, the highly polar and insoluble part of the molecules comprising the partial ester mixture, i. e. the alcohol groups, are modified by esterification to less polar ester groups. In Example I above, acetate groups are so introduced. Complete esterification gives the highest degree of compatibility and produces materials which when used in larger amounts with polyvinyl halides serve as excellent plasticizers. These latter materials are claimed in our co-pending application Ser. No. 139,128 filed January 17, 1950, now Patent 2,618,622 dated November 18, 1952. However, for the purposes of this invention, that is stabilizing the resin to the forces of heat and light, complete esterification decreases the stabilizing property which depends in part on the presence of free alcohol groups. While the completely esterified products or the substantially completely esterified products are superior plasticizers, they also exhibit a stabilizing influence on the vinyl halide resin because of the larger quantity which is used. Where stabilization efficiency is desired with minor quantities of the material, then a less completely esterified material, as contemplated by the present invention, may be used. Partial esters of castor oil of varying degrees of acetylation have been carefully examined and the optimal range of acetylation for both compatibility and stabilizing activity is from 25% to below 75% of the available hydroxyl groups in the base partial ester.

Instead of partial acetylation to achieve efficient stabilization and complete and permanent miscibility, other aliphatic acid groups may be introduced as indicated above. The size of the acyl group is not highly critical, but if the acid is of too high a molecular weight the shift from very polar alcohol groups to increasingly less polar ester groups will begin to reduce compatibility. Accordingly the preferred size of the acylating group is in the range of from 1 to 6 carbon atoms.

It is desirable that the acyl group be distributed over the alcohol groups in the various components of the partial ester mixture. The result is best obtained by partially acylating the mixture as illustrated in Example I above. An alternative method of mixing partial ester with completely acylated partial ester can yield a mixture which has the same over-all composition, but stabilizing tests show that the latter is less effective and less compatible. Thus the preferred method of preparation is by acylation of the partial ester mixture to produce the desired product.

In general, we blend the stabilizers of this invention in the resin, e. g. vinyl halide resins, in amounts ranging from .1 to 10 parts per 100 parts of polymer, either as the sole agent or in combination with other well known plasticizing agents, such as the phthalates, phosphates, etc. Other resin additives such as pigments, fillers, extenders, solvents, etc. may be present in the compositions of this invention in the amounts ordinarily employed for the purposes indicated.

As indicated above, our co-pending application Ser. No. 139,128 covers acylated monohydroxy fatty acid esters of polyhydric alcohols in which form 75% to 100% of the available hydroxyl groups have been acylated by the same acylating agents as are disclosed herein. These materials acylated to this higher degree are disclosed therein as to being particularly useful for plasticizing vinyl halide-containing resins. The materials acylated to an extent less than 75% down to about 25% of the available hydroxyl groups are contemplated by the present invention and are, as indicated above, particularly suited for use as stabilizers of vinyl halide-containing resins.

Other modes of applying the principle of this invention may be employed instead of those specifically set forth above, changes being made as regards the details herein disclosed, provided the elements set forth in any of the following claims, or the equivalent of such be employed.

We, therefore, particularly point out and distinctly claim as our invention:

1. A composition comprising a polyvinyl halide-containing polymeric resin and as a stabilizer therefor from about 0.1–10 parts per 100 parts of resin of a mono-ester of a high molecular weight fatty acid containing from 18 to 24 carbon atoms and a polyhydric alcohol, in which ester from 25% to below 75% of the available free hydroxyl groups have been acylated with an aliphatic acyl compound having the general formula:

$$R-X$$

wherein R is an aliphatic acyl radical of from 1 to 6 carbon atoms and X is selected from the group consisting of —OH, —SH, —OR, —SR, and halogen.

2. A composition in accordance with claim 1 in which the polyvinyl halide-containing polymeric resin is polyvinyl chloride.

3. A composition in accordance with claim 1 in which the aliphatic acid of high molecular weight is predominantly ricinoleic acid.

4. A composition in accordance with claim 1 in which the mono-ester of a high molecular weight fatty acid is derived from castor oil by alcoholysis thereof with a polyhydric alcohol.

5. A composition in accordance with claim 1 in which the polyhydric alcohol is glycerol.

6. A composition comprising a vinyl chloride-vinyl acetate copolymer stabilized by the addition thereto of about 3 parts per 100 parts of resin of a partially acetylated partial ester of ricinoleic acid and glycerine, said ester being derived from castor oil by alcoholysis of said castor oil with glycerine, said ester being subsequently partially acetylated to the extent of from 25% to below 75% of the available hydroxyl groups in said partial ester.

7. A composition in accordance with claim 6 in which the acetylation of the partial ester is completed to the extent of 50% of the available hydroxyl groups in said partial ester.

8. A composition in accordance with claim 1 in which the aliphatic acyl compound is an alkyl acyl compound.

9. A composition in accordance with claim 1 in which R is acetyl.

OLIVER J. GRUMMITT.
ROBERT E. BLANK.
HERBERT F. SCHWARZ.

References Cited in the file of this patent

UNITED STATES PATENTS

| Number | Name | Date |
|---|---|---|
| 2,156,956 | Agens | May 2, 1939 |
| 2,310,395 | Carruthers | Feb. 9, 1943 |
| 2,356,562 | Berg et al. | Aug. 22, 1944 |
| 2,500,918 | Reuter et al. | Mar. 14, 1950 |
| 2,584,998 | Filachione et al. | Feb. 12, 1952 |